United States Patent
Estrada, Jr.

(10) Patent No.: US 11,099,924 B2
(45) Date of Patent: Aug. 24, 2021

(54) PREVENTATIVE SYSTEM ISSUE RESOLUTION

(71) Applicant: International Business Machines Corporation, Armonk, NY (US)

(72) Inventor: Raul Estrada, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 15/226,819

(22) Filed: Aug. 2, 2016

(65) Prior Publication Data

US 2018/0039533 A1 Feb. 8, 2018

(51) Int. Cl.
*G06F 11/07* (2006.01)

(52) U.S. Cl.
CPC ........ *G06F 11/0793* (2013.01); *G06F 11/076* (2013.01); *G06F 11/079* (2013.01); *G06F 11/0709* (2013.01); *G06F 11/0787* (2013.01)

(58) Field of Classification Search
CPC ............... G06F 11/0793; G06F 11/079; G06F 11/0787; G06F 11/0709; G06F 11/076
USPC .......................................................... 714/15
See application file for complete search history.

(56) References Cited

U.S. PATENT DOCUMENTS

| | | | |
|---|---|---|---|
| 6,982,842 B2 | 1/2006 | Jing et al. | |
| 7,676,445 B2 | 3/2010 | Fry et al. | |
| 7,743,283 B1 | 6/2010 | Taylor et al. | |
| 7,765,437 B2 | 7/2010 | Gittins et al. | |
| 8,316,263 B1 | 11/2012 | Gough et al. | |
| 9,141,457 B1 | 9/2015 | Ma et al. | |
| 9,317,349 B2 | 4/2016 | Jacoby et al. | |
| 2002/0078403 A1* | 6/2002 | Gullo | G06F 11/008 714/37 |
| 2004/0153823 A1* | 8/2004 | Ansari | G06F 11/0715 714/38.14 |
| 2007/0035901 A1* | 2/2007 | Albrecht | G05B 23/0283 361/61 |
| 2009/0109860 A1* | 4/2009 | Cinato | H04L 41/0677 370/242 |
| 2012/0317069 A1* | 12/2012 | Oono | G06F 11/3419 706/47 |
| 2015/0046756 A1 | 2/2015 | Sreekumaran et al. | |

(Continued)

OTHER PUBLICATIONS

NIST Cloud Computing Program, NIST, Information Technology Laboratory, Nov. 15, 2010, Last Updated Nov. 13, 2013, pp. 1-2, Retrieved from http://www.nist.gov/itl/cloud/.

(Continued)

*Primary Examiner* — Yair Leibovich
(74) *Attorney, Agent, or Firm* — Zilka-Kotab, P.C.

(57) ABSTRACT

A computer-implemented method according to one embodiment includes receiving a first plurality of events occurring during a current time period, determining whether a number of the first plurality of events exceeds a threshold for the current time period, determining whether a predetermined issue is identified by comparing the first plurality of events to a second plurality of events occurring during an historical time period, in response to a determination that the number of the first plurality of events exceeds the threshold for the current time period, and resolving the predetermined issue, in response to a determination that the predetermined issue is identified.

20 Claims, 6 Drawing Sheets

(56) References Cited

U.S. PATENT DOCUMENTS

| | | | |
|---|---|---|---|
| 2015/0134899 A1* | 5/2015 | Cudak | G06F 11/1461 |
| | | | 711/112 |
| 2016/0034525 A1* | 2/2016 | Neels | G06F 16/285 |
| | | | 707/737 |
| 2016/0147622 A1* | 5/2016 | Nichols | G06F 16/178 |
| | | | 714/57 |
| 2017/0111242 A1* | 4/2017 | Osiecki | G06F 11/34 |
| 2017/0187602 A1* | 6/2017 | Pathela | H04L 43/0852 |
| 2017/0278004 A1* | 9/2017 | McElhinney | G06Q 10/20 |

OTHER PUBLICATIONS

Mell et al., "The NIST Definition of Cloud Computing," Version 15, Oct. 7, 2009, pp. 1-2.
Mell et al. "The Nist Definition of Cloud Computing," NIST, Special Publication 800-145, Sep. 2011, pp. 1-7.

\* cited by examiner

PREVENTATIVE SYSTEM ISSUE RESOLUTION

BACKGROUND

The present invention relates to trend analysis, and more specifically, this invention relates to identifying and preventing issues within a system.

There are many serious issues that can severely impact systems performance and effectiveness. However, warning signs indicative of such issues are often overlooked, and many systems analyses are merely reactive and not preventative.

SUMMARY

A computer-implemented method according to one embodiment includes receiving a first plurality of events occurring during a current time period, determining whether a number of the first plurality of events exceeds a threshold for the current time period, determining whether a predetermined issue is identified by comparing the first plurality of events to a second plurality of events occurring during an historical time period, in response to a determination that the number of the first plurality of events exceeds the threshold for the current time period, and resolving the predetermined issue, in response to a determination that the predetermined issue is identified.

According to another embodiment, a computer program product for preventative system issue resolution comprises a computer readable storage medium having program instructions embodied therewith, wherein the computer readable storage medium is not a transitory signal per se, and where the program instructions are executable by a processor to cause the processor to perform a method comprising receiving a first plurality of events occurring during a current time period, utilizing the processor, determining, utilizing the processor, whether a number of the first plurality of events exceeds a threshold for the current time period, determining, utilizing the processor, whether a predetermined issue is identified by comparing the first plurality of events to a second plurality of events occurring during an historical time period, in response to a determination that the number of the first plurality of events exceeds the threshold for the current time period, and resolving, utilizing the processor, the predetermined issue, in response to a determination that the predetermined issue is identified.

A system according to another embodiment includes a processor, and logic integrated with the processor, executable by the processor, or integrated with and executable by the processor, where the logic is configured to receive a first plurality of events occurring during a current time period, determine whether a number of the first plurality of events exceeds a threshold for the current time period, determine whether a predetermined issue is identified by comparing the first plurality of events to a second plurality of events occurring during an historical time period, in response to a determination that the number of the first plurality of events exceeds the threshold for the current time period, and resolve the predetermined issue, in response to a determination that the predetermined issue is identified.

Other aspects and embodiments of the present invention will become apparent from the following detailed description, which, when taken in conjunction with the drawings, illustrate by way of example the principles of the invention.

DETAILED DESCRIPTION

Figure 1:
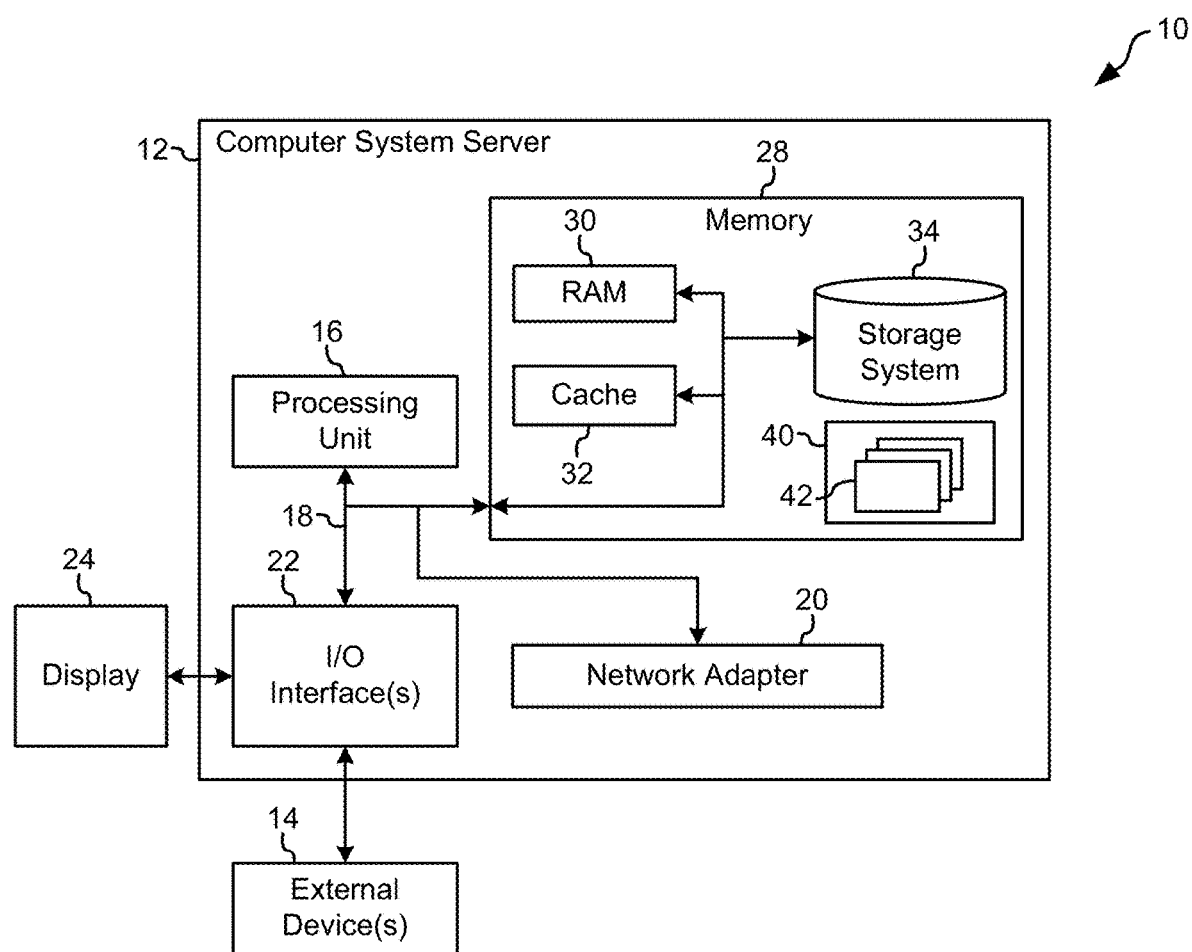
FIG. 1 depicts a cloud computing node according to an embodiment of the present invention.

The following description discloses several preferred embodiments of systems, methods and computer program products for performing preventative system issue resolution. Various embodiments provide a method to analyze key events associated with a system to predict and prevent serious issues within the system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing preventative system issue resolution.

In one general embodiment, a computer-implemented method includes receiving a first plurality of events occurring during a current time period, determining whether a number of the first plurality of events exceeds a threshold for the current time period, determining whether a predetermined issue is identified by comparing the first plurality of events to a second plurality of events occurring during an historical time period, in response to a determination that the number of the first plurality of events exceeds the threshold for the current time period, and resolving the predetermined issue, in response to a determination that the predetermined issue is identified.

In another general embodiment, a computer program product for preventative system issue resolution comprises a computer readable storage medium having program instructions embodied therewith, wherein the computer readable storage medium is not a transitory signal per se, and where the program instructions are executable by a processor to cause the processor to perform a method comprising receiving a first plurality of events occurring during a current time period, utilizing the processor, determining, utilizing the processor, whether a number of the first plurality of events exceeds a threshold for the current time period, determining, utilizing the processor, whether a predetermined issue is identified by comparing the first plurality of events to a second plurality of events occurring during an historical time period, in response to a determination that the number of the first plurality of events exceeds the threshold for the current time period, and resolving, utilizing the processor, the predetermined issue, in response to a determination that the predetermined issue is identified.

In another general embodiment, a system includes a processor, and logic integrated with the processor, executable by the processor, or integrated with and executable by the processor, where the logic is configured to receive a first plurality of events occurring during a current time period, determine whether a number of the first plurality of events exceeds a threshold for the current time period, determine whether a predetermined issue is identified by comparing the first plurality of events to a second plurality of events occurring during an historical time period, in response to a determination that the number of the first plurality of events exceeds the threshold for the current time period, and resolve the predetermined issue, in response to a determination that the predetermined issue is identified.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
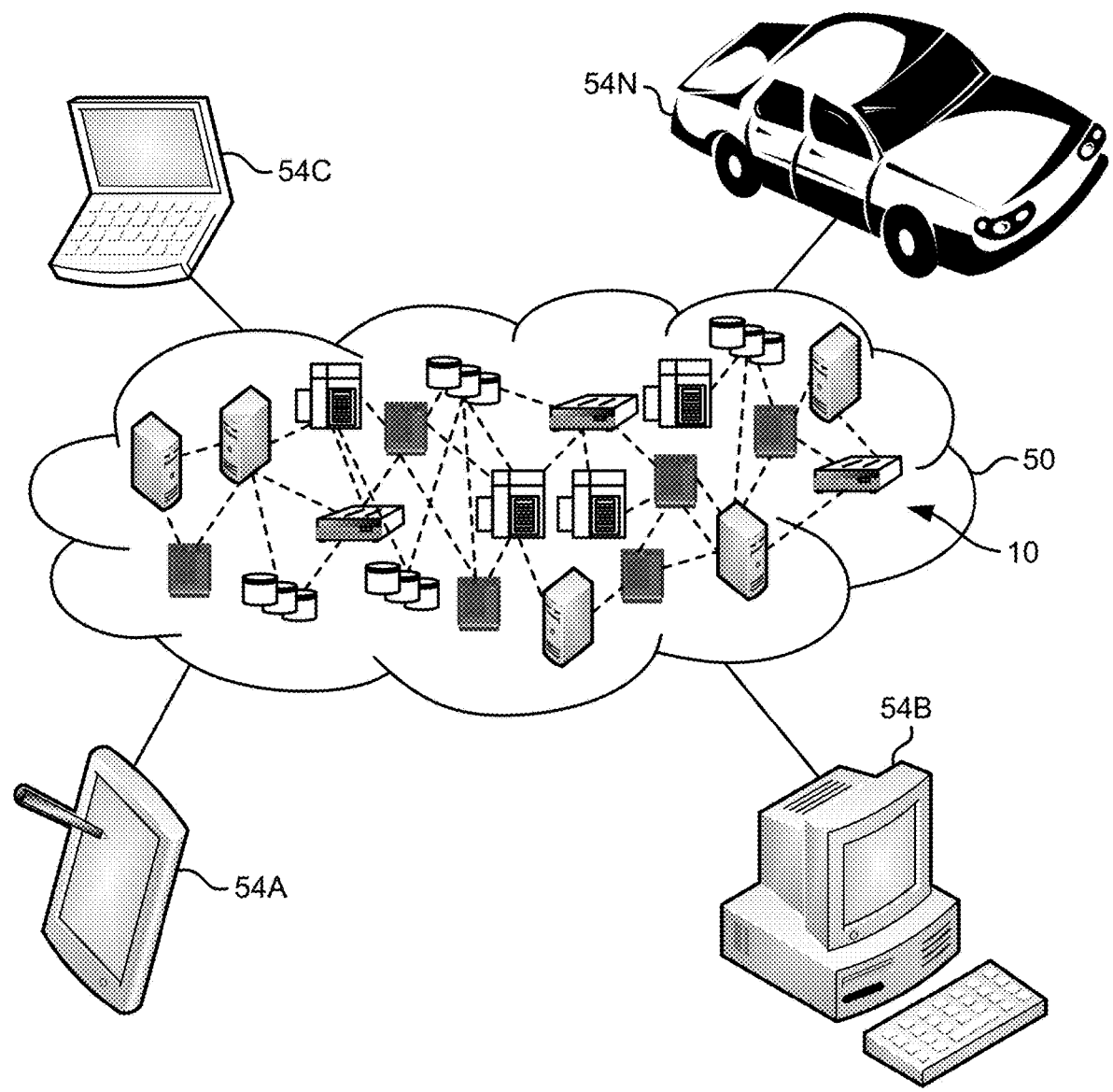
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
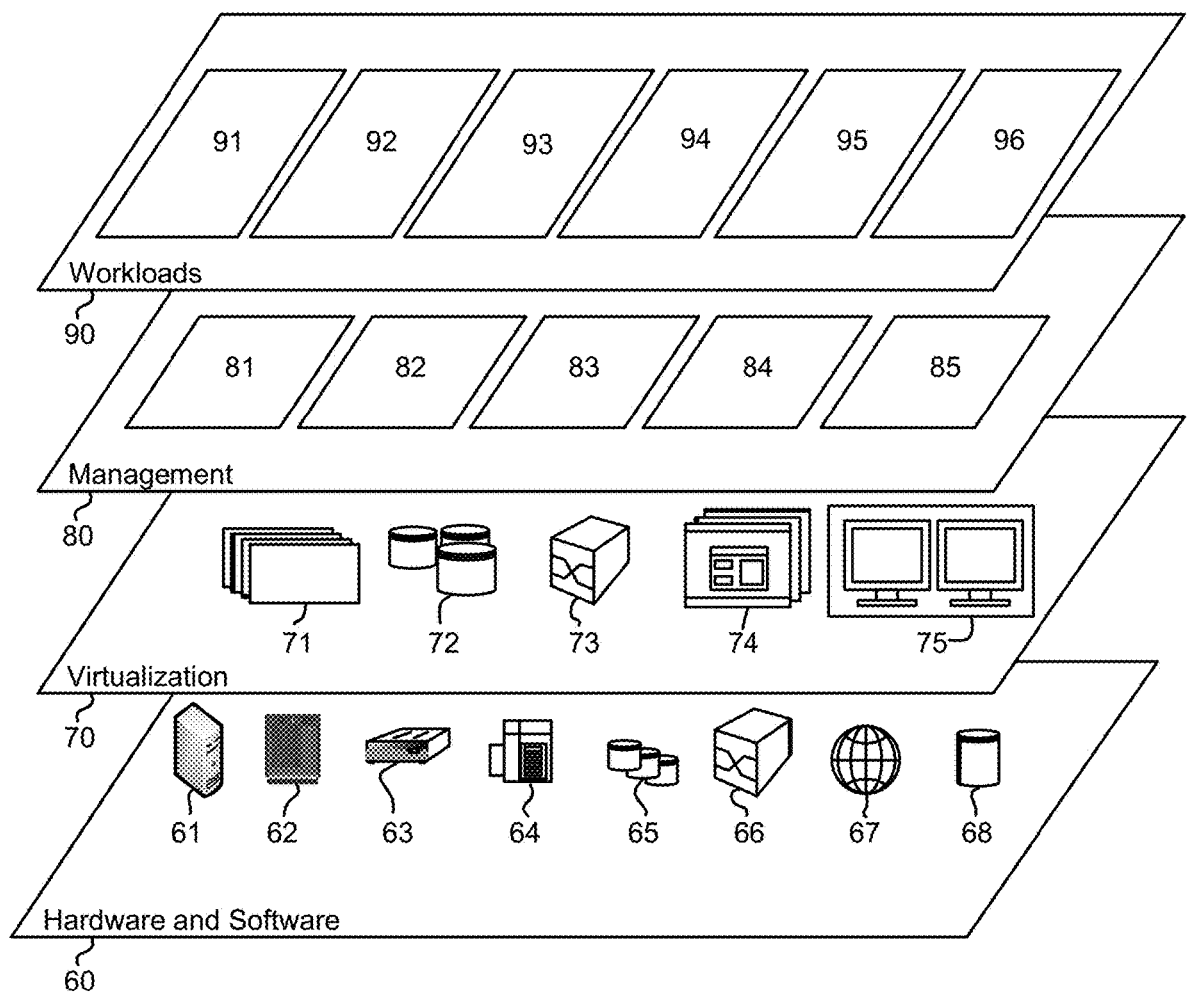
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage 96.

Figure 4:
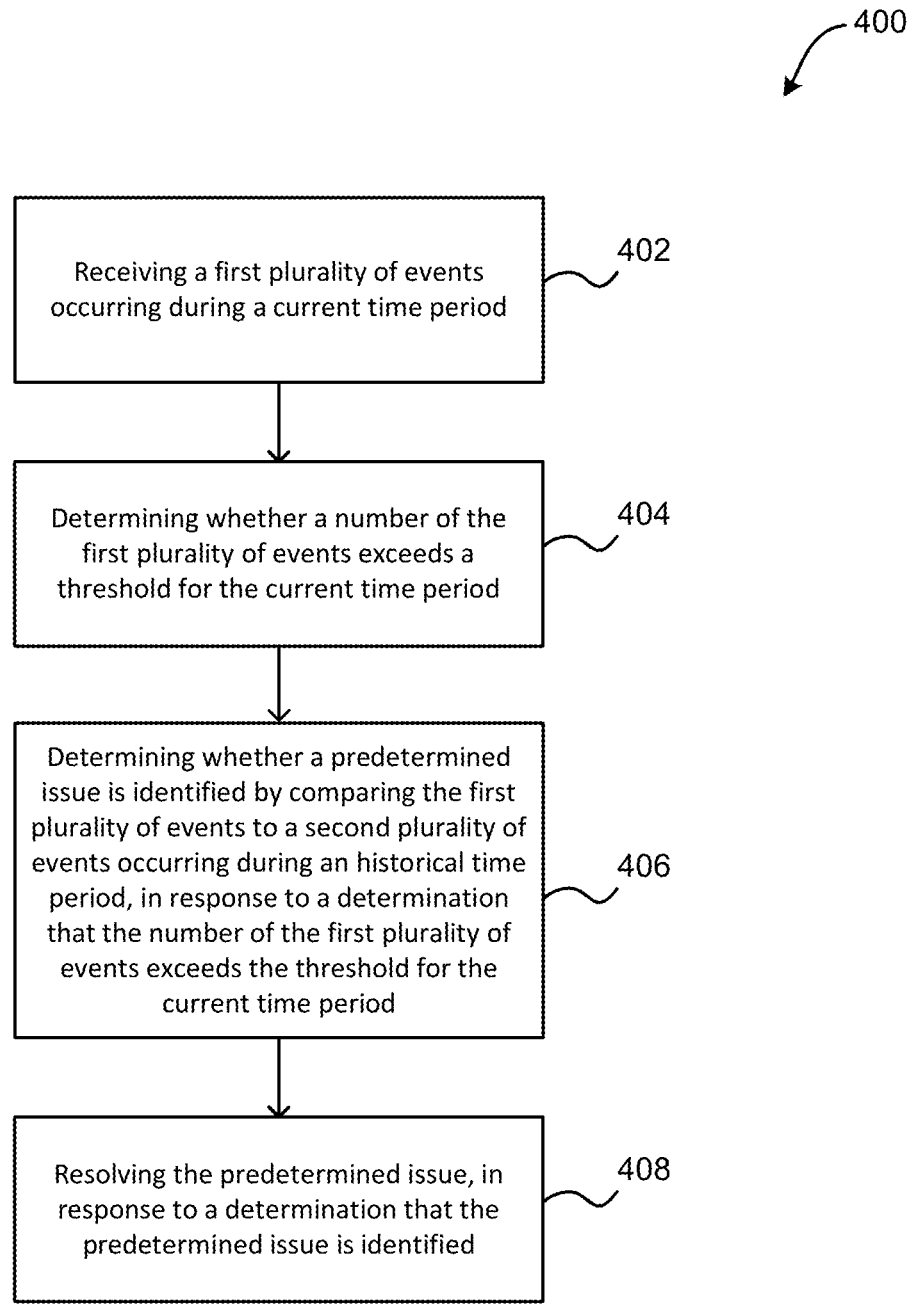
FIG. 4 illustrates a method for performing preventative system issue resolution, in accordance with one embodiment.

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a first plurality of events occurring during a current time period are received. In one embodiment, the first plurality of events may be associated with (e.g., occur within, etc.) one or more systems. For example, the first plurality of events may be associated with one or more server systems, one or more avionics systems, one or more medical systems, etc. In another embodiment, the first plurality of events may be associated with a single storage array, a plurality of connected storage arrays, etc. In yet another embodiment, the first plurality of events may be associated with a storage system included within a cloud computing environment (e.g., a cloud computing system, a hybrid cloud computing system, etc.).

Additionally, in one embodiment, each of the first plurality of events may include an instance of failure within a system. For example, each event may include one or more of a description of a required service event, a component failure, a degradation in performance, a deviation from normal or expected numbers, etc. In another example, one or more of the first plurality of events may include a repair or replacement of a power supply within a storage array, a failure of a drive within a module of a storage array, or any failure or issue with a component of a storage array (e.g., a power supply, one or more FC_Ports, one or more modules, one or more DDMs, one or more UPS, one or more internal switches, an infiniband architecture, an ethernet backbone connectivity, etc.).

Further, in one embodiment, each of the first plurality of events may be entered into a system as they occur. For example, each of the first plurality of events may be logged into the system by one or more monitoring elements when the events are detected by the monitoring elements. In another embodiment, each event may include additional information describing the event. For example, each event may include one or more of a description of the event, an identification of affected components, a time of the event, a date of the event, a severity of the event, etc.

Further still, in one embodiment, the current time period may include a predetermined period of time. For example, the current time period may include a period of time that starts at a point in the past and ends with a present time. In another embodiment, the predetermined period of time may be of any duration (e.g., a millisecond, a second, an hour, a day, a week, a year, etc.). In yet another embodiment, the current time period may be predetermined by one or more users (e.g., one or more system administrators, etc.). In still another embodiment, the current time period may be dynamically determined based on historical data (e.g., historical event data, etc.).

Additionally, as shown in FIG. 4, method 400 may proceed with operation 404, where it is determined whether a number of the first plurality of events exceeds a threshold for the current time period. In one embodiment, the threshold may include a threshold number of events for the current time period, a threshold number of a predetermined type of events for the current time period, etc. In another embodiment, the threshold may be dynamically determined (e.g., based on historical data), or may be set by one or more users.

In addition, in one embodiment, it may be determined whether the number of the first plurality of events exceeds a threshold for the current time period by comparing the number of the first plurality of events to the threshold. In another embodiment, the comparison may be performed each time one of the first plurality of events are received. In yet another embodiment, the comparison may be performed according to a predetermined time schedule.

Furthermore, as shown in FIG. 4, method 400 may proceed with operation 406, where it is determined whether a predetermined issue is identified by comparing the first plurality of events to a second plurality of events occurring during an historical time period, in response to a determination that the number of the first plurality of events exceeds the threshold for the current time period. In one embodiment, the current time period and the historical time period may have the same duration (e.g., length of time, etc.).

Further still, in one embodiment, the second plurality of events may be associated with and/or indicative of the predetermined issue. For example, the predetermined issue may have occurred in the past in response to the second plurality of events occurring during the historical time period. In another embodiment, the second plurality of events may include logged historical data. For example, the second plurality of events may be logged during system and/or component testing, during regular system and/or component use, etc.

Also, in one embodiment, the second plurality of events may be stored as a signature for the predetermined issue. In another embodiment, the predetermined issue may include an undesirable event. For example, the predetermined issue may include one or more component failures, an outage of one or more servers, a loss of data, a loss of data access, etc.

Additionally, in one embodiment, it may be determined that the predetermined issue is identified by determining that the first plurality of events occurring during the current time period match the second plurality of events occurring during the historical time period. For example, the first plurality of events may be determined to match the second plurality of events when the first plurality of events and the second plurality of events both include a predetermined number of a predetermined type of event.

In another example, the first plurality of events may be determined to match the second plurality of events when an order of the first plurality of events fully or partially matches an order of the second plurality of events. In yet another example, the first plurality of events may be determined to match the second plurality of events when a timing of the first plurality of events fully or partially matches a timing of the second plurality of events.

Also, as shown in FIG. 4, method 400 may proceed with operation 408, where in response to a determination that the predetermined issue is identified, the predetermined issue is resolved. In one embodiment, resolving the predetermined issue may include checking to see whether a fix associated with the predetermined issue exists. For example, the fix may include a code update, a patch, a firmware update, etc. In another embodiment, resolving the predetermined issue may include alerting one or more users to the predetermined issue. For example, the one or more users may be alerted via an email message, a text message, an on-screen warning, etc.

Further still, in one embodiment, resolving the predetermined issue may include proposing an existing fix to the user (e.g. during the alerting, etc.). In another embodiment, resolving the predetermined issue may include automatically applying an identified fix. For example, the existing fix may be automatically applied according to one or more predetermined settings. In yet another embodiment, the existing fix may be applied to a system associated with the first plurality of events. In still another embodiment, the existing fix may be applied to one or more systems other than the system associated with the first plurality of events (e.g., similar systems within a network, etc.).

Also, in one embodiment, results of resolving the predetermined issue may be monitored. For example, future events within a system (e.g., the system associated with the first plurality of events, etc.) may be monitored to see the effect of the fix on the predetermined issue within the system. In another example, the monitoring may indicate a prevention of future service events, an elimination of component failure indicated by the predetermined issue, etc.

In addition, in one embodiment, one or more of the results of resolving the predetermined issue may be saved for future analysis/usage along with one or more of the plurality of events, the predetermined issue, the resolution details, etc. In another embodiment, results of resolving the predetermined issue may be displayed to one or more users. For example, a graph may be displayed using a graphical user interface (GUI), where the graph may identify service events before and after the resolving of the predetermined issue to illustrate an effectiveness of the identification and resolving of the predetermined issue.

In this way, one or more predetermined issues may be predicted and resolved before they occur within a system. This may improve the performance of the system, avoid unnecessary downtime of the system, avoid data loss or data access loss, etc.

Figure 5:
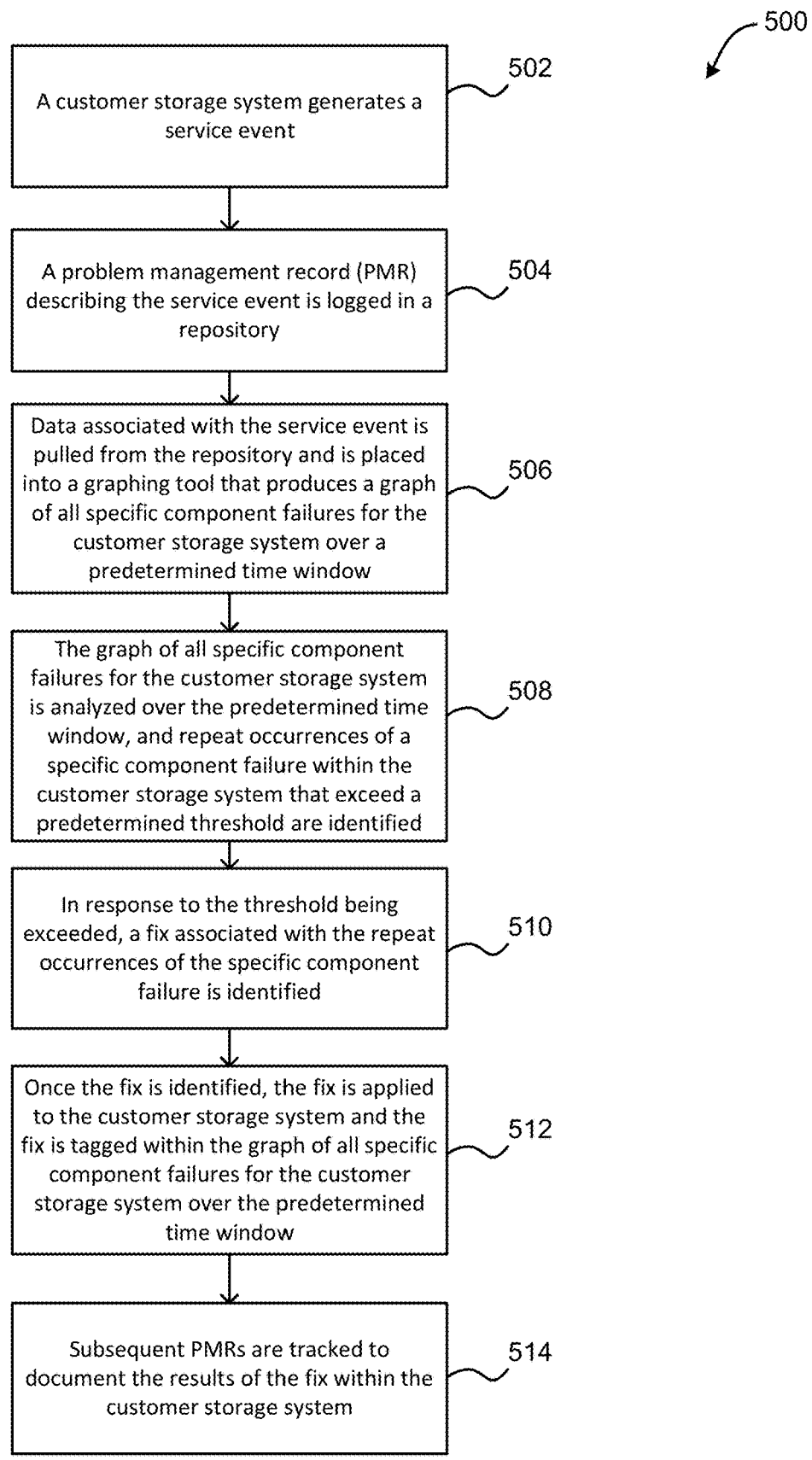
FIG. 5 illustrates a method for preventing component failure within a customer storage system, in accordance with one embodiment.

Now referring to FIG. 5, a flowchart of a method 500 for preventing component failure within a customer storage system is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a customer storage system generates a service event. In one embodiment, the customer storage system may include one or more storage arrays each containing a plurality of modules and disk drives. For example, the customer storage system may include a grid-scale storage system that is part of a hybrid cloud computing environment or cloud computing environment. In another embodiment, the service event may include an instance of failure within the customer storage system.

Additionally, method 500 may proceed with operation 504, where a problem management record (PMR) describing the service event is logged in a repository. In one embodiment, the PMR may include a description of one or more components associated with the service event, a customer identifier, etc. In another embodiment, the repository may be part of a service center. In yet another embodiment, the PMR may be created automatically by a system, manually by one or more users, etc.

Further, method 500 may proceed with operation 506, where data associated with the service event is pulled from the repository and is placed into a graphing tool that produces a graph of all specific component failures for the customer storage system over a predetermined time window. In one embodiment, the service event may be pulled from the repository as part of a scheduled data pull (e.g., a bi-weekly pull, a monthly pull, a quarterly pull, etc.). In another embodiment, the predetermined time window may cover a predetermined amount of time (e.g., two to six weeks up until a present time, etc.). In yet another embodiment, the data may be represented within the graphing tool as one or more data points of a line graph.

Further still, method 500 may proceed with operation 508, where the graph of all specific component failures for the customer storage system is analyzed over the predetermined time window, and repeat occurrences of a specific component failure within the customer storage system that exceed a predetermined threshold are identified. In one embodiment, the predetermined threshold may include a predetermined number of occurrences of the specific component failure over the predetermined time window (e.g., three occurrences over 2-6 weeks, etc.). In another embodiment, repeat occurrences of component failures may appear as spikes within the graph.

Also, method 500 may proceed with operation 510, where in response to the threshold being exceeded, a fix associated with the repeat occurrences of the specific component failure is identified. In one embodiment, development released code, firmware, and/or patches may be identified and scrutinized by a problem tracking system in order to find the fix.

In addition, method 500 may proceed with operation 512, where once the fix is identified, the fix is applied to the customer storage system and the fix is tagged within the graph of all specific component failures for the customer storage system over the predetermined time window. For example, the fix may appear as a bubble point placed within the graph, where the bubble point displays specific details about the fix (e.g., a description of the fix, a date the fix was applied, etc.).

Furthermore, method 500 may proceed with operation 514, where subsequent PMRs are tracked to document the results of the fix within the customer storage system. In one embodiment, subsequent PMR pulls over the established time increment may be tracked to document the eliminated or marginalized occurrences of the specific component failure that was previously identified within the customer storage system in order to confirm that a greater issue (e.g., a system outage, etc.) has been prevented.

In this way, preventive, actionable fix activity may be created that may eliminate catastrophic storage technology outages based on the frequency of identified service events defined over a predetermined time span, and fix identification may be performed within a product's development team's resources such as wikis and problem documentation and application via recommendations of code, firmware or patch fixes on one or more customer storage systems before an outage can happen.

Figure 6:
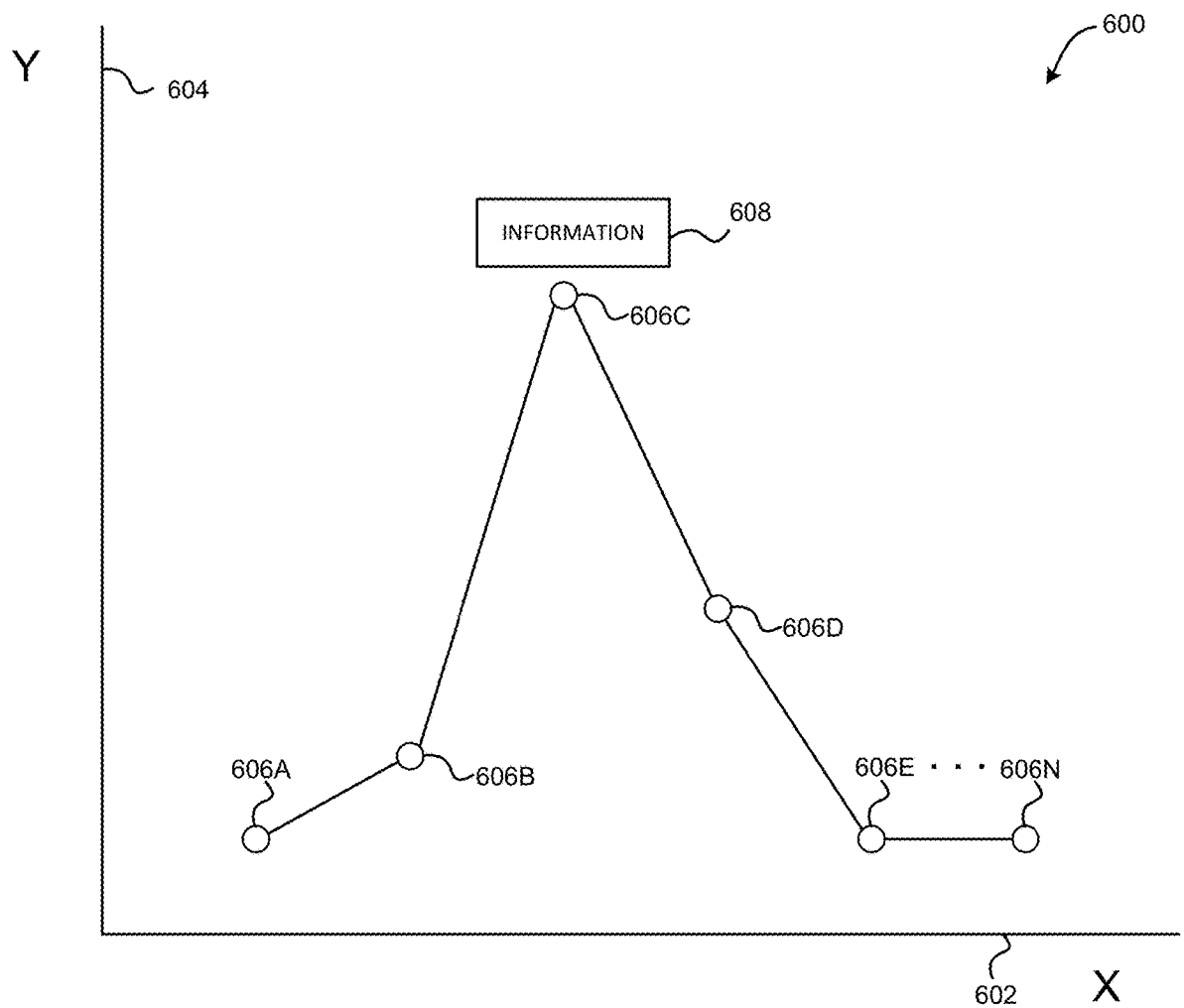
FIG. 6 illustrates an exemplary line graph, in accordance with one embodiment.

FIG. 6 illustrates an exemplary line graph 600, according to one embodiment. As shown, the line graph 600 includes an X-axis 602 indicating time and a Y-axis 604 indicating a number of events, such that each point 606A-N represents a number of reported events at a particular point in time. In one embodiment, the amount of time represented by the X-axis 602 may include a predetermined time window (e.g., 2 weeks, 6 weeks, etc.). In another embodiment, the number of events illustrated by the Y-axis 604 may include a number of service events reported by one or more sources.

Additionally, in one embodiment, the number of events illustrated by the Y-axis 604 may include a number of service events for a single device (e.g., a single customer storage system, etc.) or a plurality of devices (e.g., a plurality of linked customer storage systems, etc.). In another embodiment, problem management records (PMRs) may be received over time and converted into points 606A-N.

Further, in one embodiment, it may be determined that the number of events represented by point 606C exceed a threshold amount. In response, points 606A-C may be compared to predetermined point patterns to identify a predetermined issue and associated fix. Information 608 may indicate a date the fix was applied, as well as any additional details for the fix (e.g., one or more systems the fix was applied on, whether the fix was manually or automatically applied, specific hardware and/or software involved in the fix, etc.).

Further still, in one embodiment, points 606D-N may illustrate events occurring after the fix was applied at point 606C. Points 606D-N may illustrate to a user (e.g., customer, etc.) that the fix was effective, reduced a number of events occurring after the fix, and prevented the identified predetermined issue.

In this way, issues may be anticipated and resolved on single or multiple systems via an advanced trending analysis, and may be shown utilizing a line graph 600 that may resemble an EKG for one or more users to review.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving a first plurality of events associated with a system occurring during a current time period, utilizing a processor, the first plurality of events including at least one instance of hardware component failure within the system;
logging the first plurality of events in a repository, utilizing the processor;
determining, utilizing the processor, whether a predetermined issue is identified by comparing, utilizing the processor, the first plurality of events to a second plurality of events occurring during an historical time period, in response to determining that a number of the first plurality of events exceeds a threshold number of a predetermined type of events for the current time period, where the second plurality of events includes logged data stored as a signature for the predetermined issue; and
resolving the predetermined issue at the system, including determining and applying a fix associated with the predetermined issue, utilizing the processor, in response to determining that an order and a timing of the first plurality of events matches an order and timing of the second plurality of events.

2. The computer-implemented method of claim 1, wherein the first plurality of events further include a degradation of performance within the system and a required service event within the system.

3. The computer-implemented method of claim 1, wherein each of the first plurality of events are logged into the repository by one or more monitoring elements when each of the first plurality of events are detected by one or more monitoring elements.

4. The computer-implemented method of claim 1, wherein:
the first plurality of events further include a description of a repair or replacement of a power supply within a storage array, and a failure of a drive within a module of a storage array, and
each of the first plurality of events further include a description of the event, an identification of components affected by the event, a time of the event, and a date of the event.

5. The computer-implemented method of claim 1, wherein the current time period and the historical time period have an equal duration.

6. The computer-implemented method of claim 1, wherein the predetermined issue has occurred in the past in response to the second plurality of events occurring during the historical time period.

7. The computer-implemented method of claim 1, wherein the predetermined issue is selected from a group consisting of component failure, an outage of one or more servers, a loss of data, and a loss of data access.

8. The computer-implemented method of claim 1, further comprising applying the fix to one or more similar systems other than the system associated with the first plurality of events.

9. The computer-implemented method of claim 1, further comprising monitoring results of resolving the predetermined issue to determine an effect of the fix within the system.

10. The computer-implemented method of claim 1, wherein:
the predetermined issue includes a loss of data access,
each of the first plurality of events further includes a description of the event, an identification of affected components, a time of the event, a date of the event, and a severity of the event, and
further comprising applying the fix to one or more similar systems other than the system associated with the first plurality of events.

11. A computer program product for preventative system issue resolution, the computer program product comprising a computer readable storage medium having program instructions embodied therewith, wherein the computer readable storage medium is not a transitory signal per se, the program instructions to be executed by a processor to cause the processor to perform a method comprising:
receiving a first plurality of events associated with a system occurring during a current time period, utilizing the processor, the first plurality of events including at least one instance of hardware component failure within the system;
logging the first plurality of events in a repository, utilizing the processor;
determining, utilizing the processor, whether a predetermined issue is identified by comparing, utilizing the processor, the first plurality of events to a second plurality of events occurring during an historical time period, in response to determining that a number of the first plurality of events exceeds a threshold number of a predetermined type of events for the current time period, where the second plurality of events includes logged data stored as a signature for the predetermined issue; and
resolving at the system, utilizing the processor, the predetermined issue, including determining and applying a fix associated with the predetermined issue, in response to determining that an order and a timing of the first plurality of events matches an order and timing of the second plurality of events.

12. The computer program product of claim 11, wherein the first plurality of events further include a degradation of performance within the system and a required service event within the system.

13. The computer program product of claim 11, wherein each of the first plurality of events are logged into the repository by one or more monitoring elements when each of the first plurality of events are detected by one or more monitoring elements.

14. The computer program product of claim 11, wherein:
the first plurality of events further include a description of a repair or replacement of a power supply within a storage array, and a failure of a drive within a module of a storage array, and
each of the first plurality of events further include a description of the event, an identification of components affected by the event, a time of the event, and a date of the event.

15. The computer program product of claim 11, wherein the current time period and the historical time period have an equal duration.

16. The computer program product of claim 11, wherein the predetermined issue has occurred in the past in response to the second plurality of events occurring during the historical time period.

17. The computer program product of claim 11, wherein the predetermined issue is selected from a group consisting of component failure, an outage of one or more servers, a loss of data, and a loss of data access.

18. The computer program product of claim 11, further comprising applying the fix to one or more similar systems other than the system associated with the first plurality of events, utilizing the processor.

19. The computer program product of claim 11, further comprising monitoring results of resolving the predetermined issue to determine an effect of the fix within the system.

20. A system, comprising:
a hardware processor; and
logic integrated with the hardware processor, executable by the hardware processor, or integrated with and executable by the hardware processor, the logic being configured to:
receive a first plurality of events associated with a system occurring during a current time period, the first plurality of events including at least one instance of hardware component failure within the system;
log the first plurality of events in a repository;
determine whether a predetermined issue is identified by comparing the first plurality of events to a second plurality of events occurring during an historical time period, in response to determining that a number of the first plurality of events exceeds a threshold number of a predetermined type of events for the current time period, where the second plurality of events includes logged data stored as a signature for the predetermined issue; and resolve the predetermined issue at the system, including determining and applying a fix associated with the predetermined issue, in response to determining that an order and a timing of the first plurality of events matches an order and timing of the second plurality of events.

* * * * *